(12) United States Patent
Bassill et al.

(10) Patent No.: US 12,507,324 B2
(45) Date of Patent: Dec. 23, 2025

(54) TEMPERATURE-REGULATING APPLIANCE WITH REMOVABLE BASE

(71) Applicant: Hatco Corporation, Milwaukee, WI (US)

(72) Inventors: Nick Bassill, Milwaukee, WI (US); Edward Nunn, Milwaukee, WI (US); Mark Gilpatric, Milwaukee, WI (US); Ishan Shah, Milwaukee, WI (US); Fei Shang, Milwaukee, WI (US)

(73) Assignee: Hatco Corporation, Milwaukee, WI (US)

( * ) Notice: Subject to any disclaimer, the term of this patent is extended or adjusted under 35 U.S.C. 154(b) by 0 days.

(21) Appl. No.: 18/511,030

(22) Filed: Nov. 16, 2023

(65) Prior Publication Data
US 2024/0121865 A1    Apr. 11, 2024

Related U.S. Application Data

(63) Continuation of application No. 18/152,852, filed on Jan. 11, 2023, now Pat. No. 11,849,523, which is a
(Continued)

(51) Int. Cl.
*H05B 6/06* (2006.01)
*F24C 7/06* (2006.01)
(Continued)

(52) U.S. Cl.
CPC ............ *H05B 6/062* (2013.01); *F24C 7/067* (2013.01); *F24C 7/083* (2013.01); *F24C 15/007* (2013.01); *H05B 6/12* (2013.01); *H05B 2213/07* (2013.01)

(58) Field of Classification Search
CPC ........ H05B 6/12; H05B 6/062; H05B 6/1209; H05B 2213/07; F24C 15/108; F24C 15/007; F24C 7/083; F24C 7/067
See application file for complete search history.

(56) References Cited

U.S. PATENT DOCUMENTS 3,632,983 A     1/1972  Dills
4,363,956 A  * 12/1982  Scheidler ............... A47B 77/08
                                            219/460.1
(Continued)

FOREIGN PATENT DOCUMENTS

DE    10 2005 058 505 A1    6/2007
DE    10 2015 201 079 A1    9/2015
(Continued)

OTHER PUBLICATIONS

Machine translation of J P-H07226288: Kaneko, Heating body for electric cooking device, 1994 (Year: 1994).

*Primary Examiner* — Edward F Landrum
*Assistant Examiner* — Kuangyue Chen
(74) *Attorney, Agent, or Firm* — Foley & Lardner LLP (57) ABSTRACT

One embodiment relates to a temperature-regulating appliance comprising. The temperature-regulating appliance includes a base and a mounting adapter. The base includes a housing defining an internal compartment and a thermal element disposed within the internal compartment of the housing. The mounting adapter extends along opposing edges of the housing and is coupled directly to a bottom of the housing. The mounting adapter is configured to facilitate detachably coupling the base to a cooktop.

18 Claims, 4 Drawing Sheets

Related U.S. Application Data continuation of application No. 16/415,938, filed on May 17, 2019, now Pat. No. 11,582,837.

(60) Provisional application No. 62/673,762, filed on May 18, 2018.

(51) Int. Cl.
*F24C 7/08* (2006.01)
*F24C 15/00* (2006.01)
*H05B 6/12* (2006.01)

(56) References Cited

U.S. PATENT DOCUMENTS

| | | | |
|---|---|---|---|
| 6,436,796 B1 | 8/2002 | Mailho et al. | |
| 6,736,901 B2 | 5/2004 | Nishibayashi | |
| 8,124,200 B2 | 2/2012 | Quella et al. | |
| 8,269,149 B2 | 9/2012 | Acero Acero et al. | |
| 8,968,848 B2 | 3/2015 | Quella et al. | |
| 9,491,809 B2 | 11/2016 | Shaffer | |
| 10,582,573 B2 | 3/2020 | Hoare et al. | |
| 11,156,364 B2 | 10/2021 | Yang | |
| 2002/0125245 A1* | 9/2002 | Fuchs | A47J 36/26 219/622 |
| 2009/0057298 A1 | 3/2009 | Komma | |
| 2009/0139986 A1 | 6/2009 | Lee et al. | |
| 2012/0063799 A1 | 3/2012 | Ueno | |
| 2013/0037535 A1 | 2/2013 | Ogasawara et al. | |
| 2013/0140297 A1 | 6/2013 | Okuda et al. | |
| 2015/0008755 A1 | 1/2015 | Sone | |
| 2016/0014849 A1 | 1/2016 | Hegedis et al. | |
| 2017/0191672 A1* | 7/2017 | Kim | H05B 6/647 |
| 2019/0029081 A1 | 1/2019 | Nam et al. | |
| 2019/0131824 A1 | 5/2019 | Suga et al. | |
| 2019/0203871 A1* | 7/2019 | Gawryla | F16L 59/14 |
| 2020/0010332 A1 | 1/2020 | Lang | |

FOREIGN PATENT DOCUMENTS

| | | |
|---|---|---|
| GB | 2 552 531 | 1/2018 |
| JP | 02-114488 A | 4/1990 |
| JP | 07-226288 A | 8/1995 |
| JP | 2002-083674 | 3/2002 |
| KR | 20110076166 A | 7/2011 |

* cited by examiner

TEMPERATURE-REGULATING APPLIANCE WITH REMOVABLE BASE

CROSS-REFERENCE TO RELATED PATENT APPLICATIONS

This application (a) is a continuation of U.S. patent application Ser. No. 18/152,852, filed Jan. 11, 2023, which is a continuation of U.S. patent application Ser. No. 16/415,938, filed May 17, 2019, which claims the benefit of U.S. Provisional Patent Application No. 62/673,762, filed May 18, 2018, and (b) is related to (i) U.S. patent application Ser. No. 16/415,943, filed May 17, 2019, which claims the benefit of U.S. Provisional Patent Application No. 62/673,781, filed May 18, 2018, and U.S. Provisional Patent Application No. 62/673,785, filed May 18, 2018, (ii) U.S. patent application Ser. No. 16/416,124, filed May 17, 2019, which claims the benefit of U.S. Provisional Patent Application No. 62/673,763, filed May 18, 2018, U.S. Provisional Patent Application No. 62/673,768, filed May 18, 2018, U.S. Provisional Patent Application No. 62/673,778, filed May 18, 2018, and U.S. Provisional Patent Application No. 62/673,780, filed May 18, 2018, and (iii) U.S. patent application Ser. No. 16/416,111, filed May 17, 2019, which claims the benefit of U.S. Provisional Patent Application No. 62/673,769, filed May 18, 2018, U.S. Provisional Patent Application No. 62/673,772, filed May 18, 2018, and U.S. Provisional Patent Application No. 62/673,775, filed May 18, 2018, all of which are incorporated herein by reference in their entireties.

BACKGROUND

Food service operators utilize built-in induction ranges on their serving lines. Traditionally, parts of the induction range are mounted permanently into a countertop (e.g., a stone countertop). The induction range typically includes a base and a top piece (e.g., a ceramic glass top) that is accessible to the user. The top piece may be permanently installed in the countertop using an adhesive product (e.g., silicone glue). Among other benefits, the adhesive product secures the top piece directly to the countertop to prevent water and spills from migrating through the interface between the top piece and the countertop. The adhesive product may also be used to secure a stainless ring around the edge of the top piece for aesthetic reasons and to better protect the joint formed between the top piece and the countertop.

An issue often experienced with built-in induction ranges occurs when the base requires servicing. During a typical service event, in order to access the damaged components in the base, the top piece must be cut out of the countertop. A new top piece or repaired top piece and base are then re-installed into the countertop. Again, an adhesive product (e.g., silicon glue) must then be used to re-secure the induction range to the countertop. Most service technicians are not skilled at working with these adhesives and the quality of the work product may be poor. Some service technicians may even refuse to install a ceramic top when the reapplication of such an adhesive is required.

SUMMARY

One embodiment relates to a temperature-regulating appliance. The temperature-regulating appliance includes a base and a mounting adapter. The base includes a housing defining an internal compartment and a thermal element disposed within the internal compartment of the housing. The mounting adapter extends along opposing edges of the housing and is coupled directly to a bottom of the housing. The mounting adapter is configured to facilitate detachably coupling the base to a cooktop.

Another embodiment relates to a temperature-regulating appliance. The temperature-regulating appliance includes a housing, a thermal element, and a temperature sensor. The housing defines an interior chamber. The thermal element is positioned with the interior chamber. The temperature sensor is positioned outside of the interior chamber and spaced from the thermal element. The temperature sensor is configured to remain with the housing when the housing is detached from a cooktop.

Still another embodiment relates to an induction range. The induction range includes a base, a mounting adapter, and a temperature sensor. The base includes a housing defining an internal compartment, an inductive heating element positioned within the internal compartment of the housing, and insulation disposed along a top of the housing. The mounting adapter is positioned to facilitate detachably coupling the base to a cooktop. The temperature sensor is positioned outside of the internal compartment.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, an appliance (e.g., an induction range, etc.) is configured to be mounted to a countertop (e.g., built-in to the countertop, adhesively secured thereto, etc.). The appliance includes a top portion and a base portion. The top portion is configured to provide a cooking, warming, and/or cooling surface and support cookware and/or food product to be cooked, heated, warmed, and/or cooled by the appliance. In some embodiments, the base portion includes various components configured to facilitate cooking and/or warming operations (e.g., by electromagnetic induction, conduction, etc.). In other embodiments, the base portion additionally or alternatively includes various components configured to facilitate cooling operations (e.g., by conduction, etc.). The base portion may be mounted to the top portion in a configuration that facilitates selective removal of the base portion from the top portion. Such an arrangement may facilitate easy access to the base portion during service events (e.g., where one or more components in the base portion may need to be repaired, replaced, cleaned, etc.). Accordingly, the appliance of the present disclosure may facilitate removing the base portion from the top portion without breaking a connection and watertight seal between the top portion of the appliance and the countertop the appliance is installed in.

According to the exemplary embodiment shown in FIGS. 1-7, an appliance, shown as temperature-regulating appliance 100, includes a first portion (e.g., a cooktop, a cooling plate, etc.), shown as top portion 200, and a second portion (e.g., a base portion, a base cartridge, etc.), shown as base 300, detachably coupled to the top portion 200 via an adapter, shown as mounting adapter 600. According to an exemplary embodiment, the top portion 200 and the base 300 are configured such that the temperature-regulating appliance 100 is a built-in induction range. In other embodiments, the top portion 200 and the base 300 are otherwise configured to provide another type of drop-in or built-in appliance other than an induction range. By way of example, the temperature-regulating appliance 100 may be configured as a non-induction cooktop such as an electric conductive coil cooktop or other suitable drop-in appliance where the cooktop and the base thereof are capable of being detachably coupled by a mounting adapter. By way of another example, the temperature-regulating appliance 100 may be configured as a cooling system configured to cool items disposed on the top portion 200.

Figure 1:
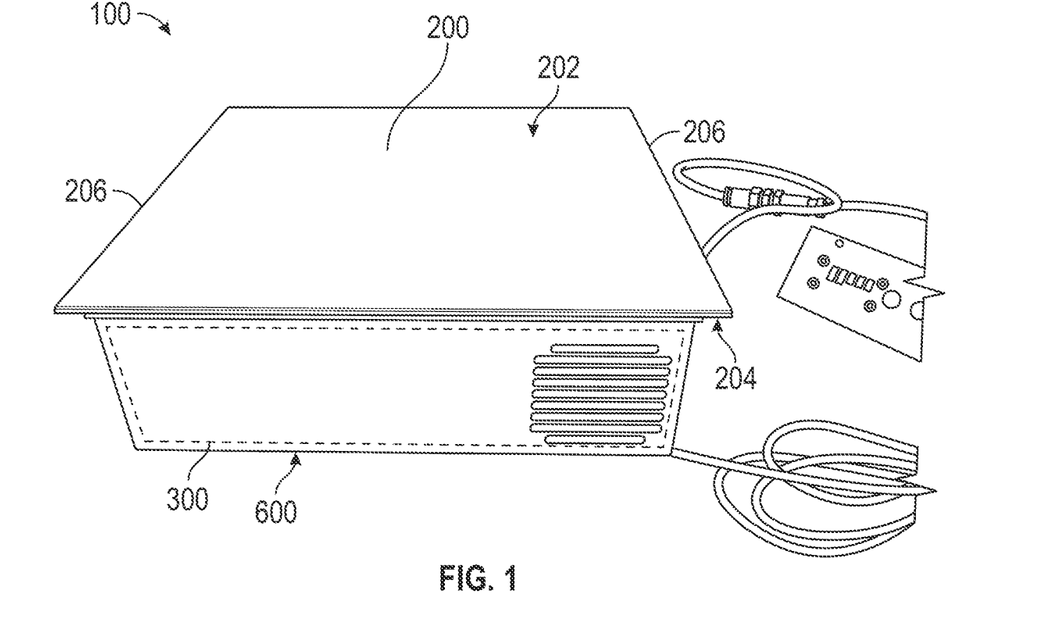
FIG. 1 is a perspective view of an appliance having a top portion and a base portion coupled together with an adapter, according to an exemplary embodiment.
Figure 2:
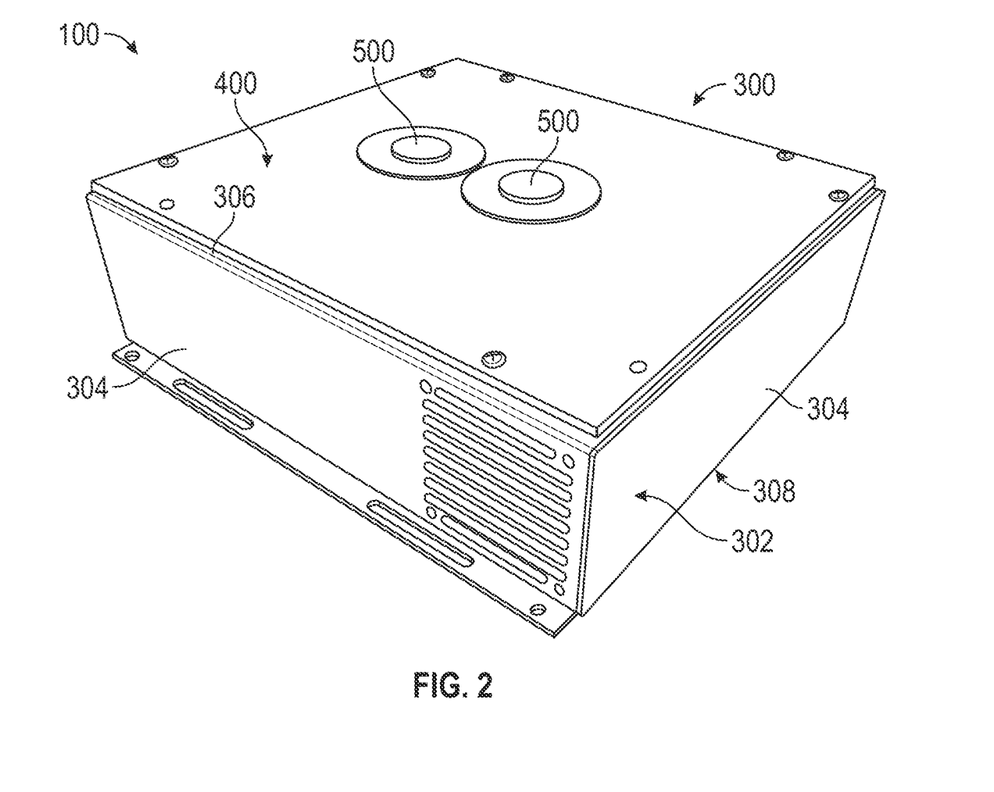
FIG. 2 is a perspective view of the base portion of the appliance of FIG. 1, according to an exemplary embodiment.
Figure 3:
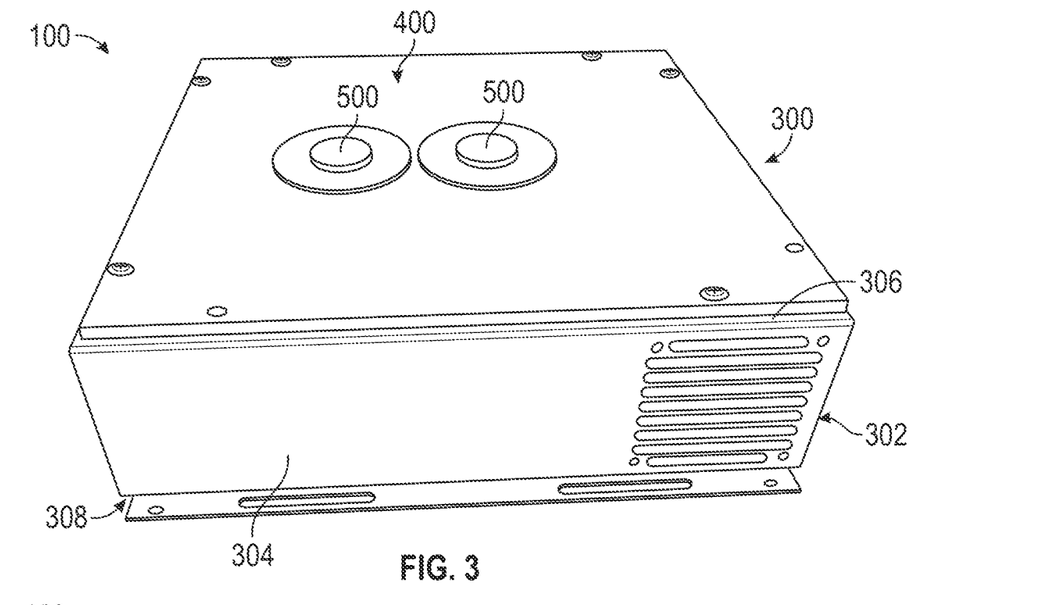
FIG. 3 is another perspective view of the base portion of FIG. 2, according to an exemplary embodiment.
Figure 7:
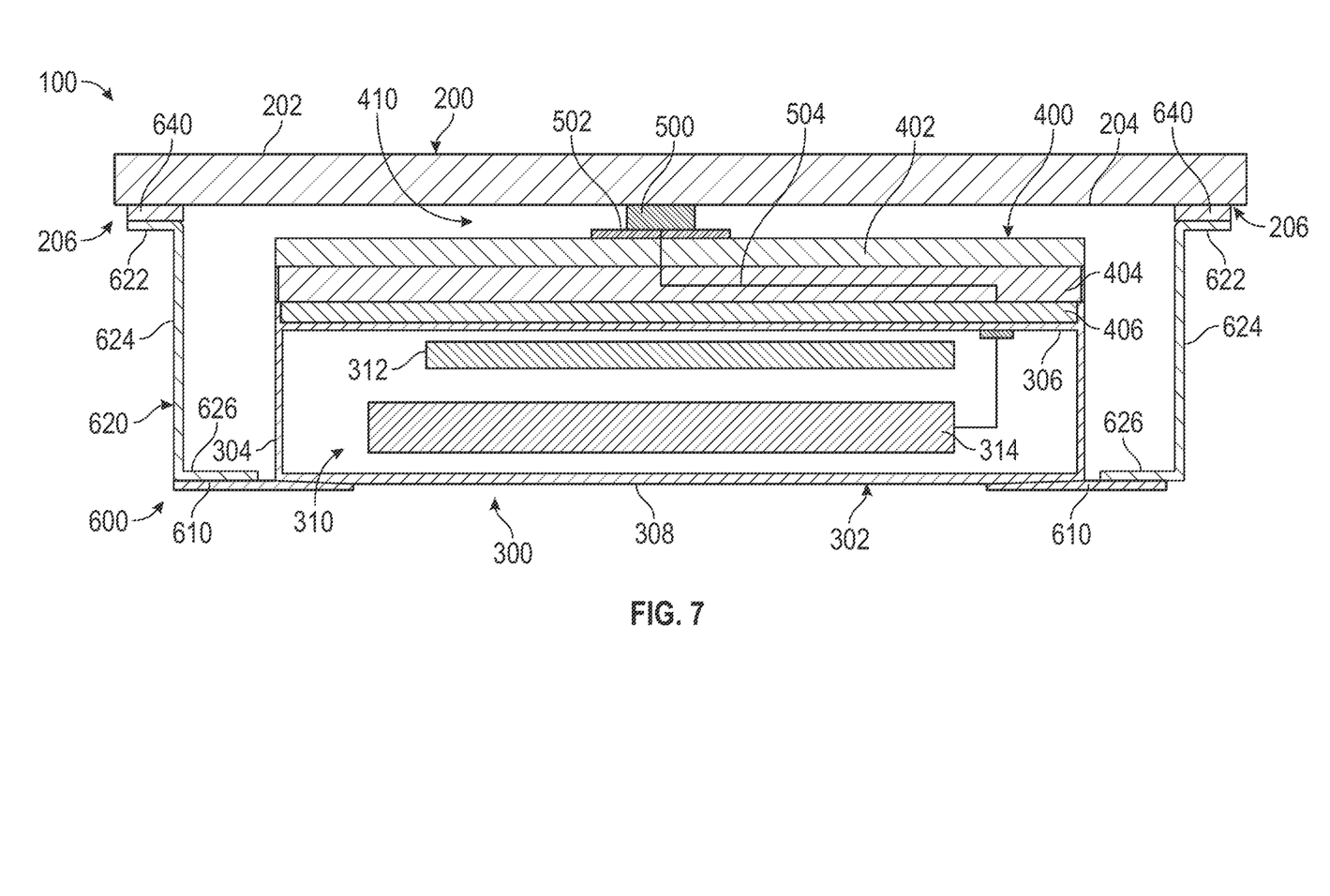
FIG. 7 is a cross-sectional side view of the appliance of FIG. 1, according to an exemplary embodiment.

As shown in FIGS. 1 and 7, the top portion 200 is configured as a plate having a first surface, shown as upper surface 202, and an opposing second surface, shown as lower surface 204. According to an exemplary embodiment, the top portion 200 is configured to support one or more pieces of cookware (e.g., pots, pans, kettles, etc.) and/or food items. In some embodiments, the top portion 200 is manufactured from a ceramic glass material. In other embodiments, the top portion 200 is manufactured from another material suitable for the heating, warming, and/or cooling operations disclosed herein (e.g., a metal or metal alloy, glass, ceramic, etc.). According to the exemplary embodiment shown in FIG. 1, the top portion 200 has a square shape with a width and height of twelve inches. However, it should be understood that the top portion 200 may have a variety of different shapes, sizes, colors, material compositions, and/or textures depending on the model and/or application of the temperature-regulating appliance 100. The top portion 200 may therefore have another shape such as an elongated rectangle, a circle, and/or any other suitable shape.

Figure 4:
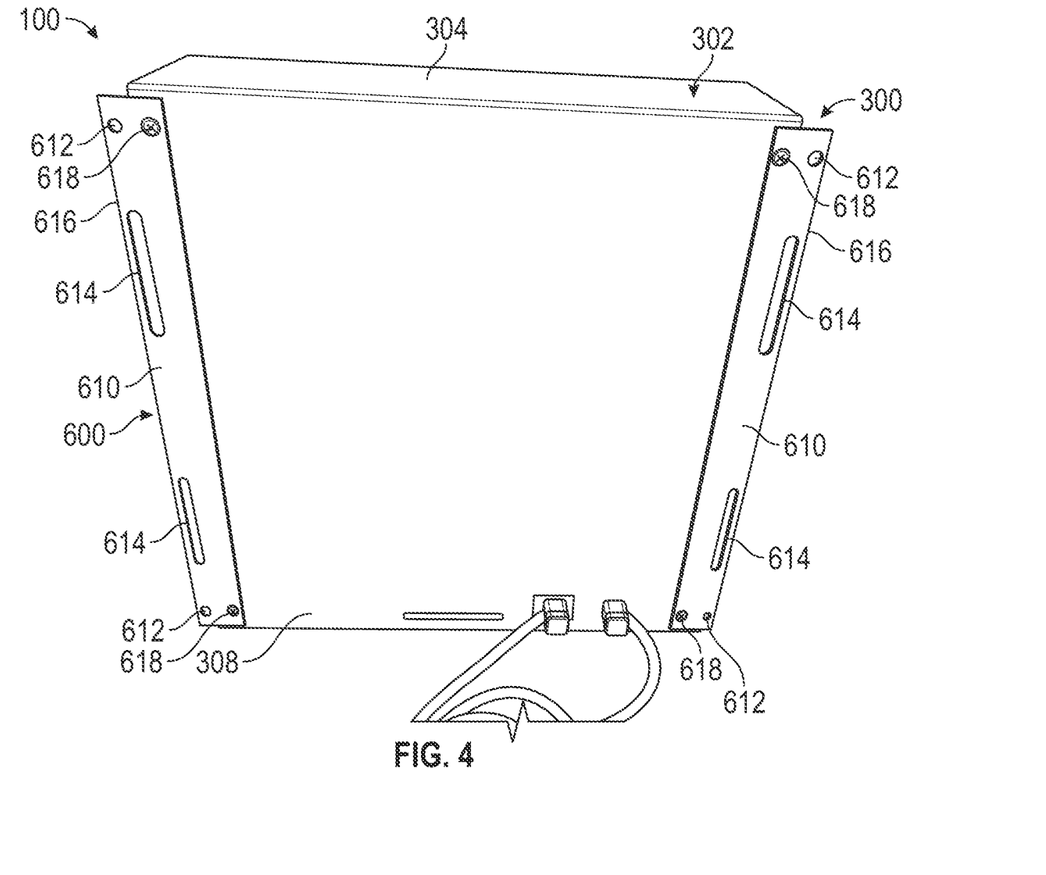
FIG. 4 is a bottom perspective view of the base portion of FIG. 2, according to an exemplary embodiment.
Figure 5:
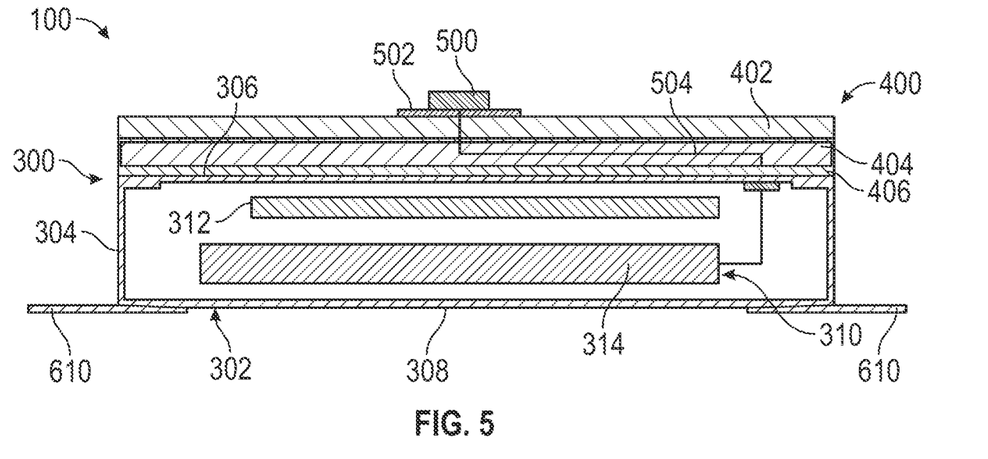
FIG. 5 is a cross-sectional side view of the base portion of FIG. 2, according to an exemplary embodiment.

As shown in FIGS. 1, 5, and 7, the base 300 is positioned beneath the top portion 200. As shown in FIGS. 2-5 and 7, the base 300 includes an outer shell, shown as housing 302, having a plurality of sidewalls, shown as sidewalls 304, an upper surface, shown as upper wall 306, and an opposing second surface, shown as lower wall 308, coupled to the upper wall 306 by the sidewalls 304. The sidewalls 304, the upper wall 306, and the lower wall 308 cooperatively define an interior chamber (e.g., a base chamber, an internal cavity, etc.). According to the exemplary embodiment shown in FIGS. 2, 3, and 6, the base 300 has a square cross-sectional shape, corresponding to the shape of the top portion 200. In other embodiments, the base 300 has another shape (e.g., rectangular, circular, etc.) that is the same or different than the shape of the top portion 200.

As shown in FIGS. 5 and 7, the base 300 includes an electronics package, shown as electronics package 310, disposed within the interior chamber of the housing 302. According to an exemplary embodiment, the electronics package 310 includes various components configured to power and control operation of the temperature-regulating appliance 100 to facilitate heating and/or warming cookware and/or food product disposed on the top portion 200 through inductive heating. In other embodiments, the electronics package 310 includes various components configured to power and control operation of the temperature-regulating appliance 100 to facilitate heating, warming, and/or cooling cookware and/or food product disposed on the top portion 200 through non-inductive means (e.g., conduction, etc.).

As shown in FIGS. 5 and 7, the electronics package 310 includes a temperature-regulating element, shown as thermal element 312, and a power and control system, shown as power and control unit 314. According to an exemplary embodiment, the thermal element 312 is configured as an inductive heating element (e.g., an inductive heating coil, etc.) configured to facilitate heating and/or warming cookware and/or food product disposed on the top portion 200 via inductive heating. In such an embodiment, food product may be wrapped in a wrapper or stored in a bag, box, or other suitable container including a current conducting material similar to the wrapper and the container disclosed in U.S. Pat. No. 8,124,200, filed Oct. 25, 2005, and U.S. Pat. No. 8,968,848, filed Feb. 14, 2012, both of which are incorporated herein by reference in their entireties. In other embodiments, the thermal element 312 is configured as another type of heating element (e.g., a conductive heating coil, etc.). In still other embodiments, the thermal element 312 is configured as a cooling element (e.g., a Peltier device, a thermoelectric cooler, etc.). The power and control unit 314 may include an inverter (e.g., an induction inverter, etc.) configured to power the thermal element 312. In some embodiments, the electronics package 310 includes a plurality of thermal elements 312 variously positioned about the base 300 to facilitate variably heating, warming, and/or cooling cookware and/or food product disposed on the top portion 200. By way of example, the temperature-regulating appliance 100 may be configured to facilitate (i) heating, warming, and/or cooling a first piece of cookware and/or food product disposed on the top portion 200 to a first temperature and (ii) heating, warming, and/or cooling a second piece of cookware and/or food product disposed on the top portion 200 to a second temperature that is different than the first temperature. By way of another example, the thermal element 312 and the power and control unit 314 may include a plurality of induction elements, such as double or quad induction inverter and heating element arrangements.

According to an exemplary embodiment, the power and control unit 314 is configured to power and control operation of the thermal element 312 based on user commands, sensor feedback signals (e.g., from a temperature measurement sensor, etc.), or other methods used to determine the temperature of a piece of cookware and/or food product being heated and/or cooled. Accordingly, the power and control unit 314 may be coupled to the thermal element 312, a power source (e.g., a mains power supply, an external power source, etc.), a user interface (e.g., knobs, buttons, touch screens, etc. of the temperature-regulating appliance 100), and/or one or more sensors to perform the functions of the temperature-regulating appliance 100.

The power and control unit 314 may include a controller implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. The controller may include a processing circuit having a processor and a memory. The processing circuit may include an ASIC, one or more FPGAs, a DSP, circuits containing one or more processing components, circuitry for supporting a microprocessor, a group of processing components, or other suitable electronic processing components. The processor may be configured to execute computer code stored in the memory to facilitate the activities described herein. The memory may be any volatile or non-volatile computer-readable storage medium capable of storing data or computer code relating to the activities described herein. The memory may include computer code modules (e.g., executable code, object code, source code, script code, machine code, etc.) configured for execution by the processor.

As shown in FIGS. 5 and 7, the base 300 includes an intermediate layer, shown as insulation 400, disposed along the upper wall 306 of the housing 302 such that the insulation 400 is positioned between the lower surface 204 of the top portion 200 and the upper wall 306 of the housing 302. As shown in FIG. 7, the insulation 400 is spaced a distance from the lower surface 204 of the top portion 200 such that a gap, shown as airgap 410, is formed therebetween. In other embodiments, the insulating 400 is sized to eliminate the airgap 410. In some embodiments, the base 300 does not includes the insulation 400 (e.g., in embodiments where the temperature-regulating appliance 100 is not an induction range, etc.)

According to the exemplary embodiment shown in FIGS. 5 and 7, the insulation 400 has a multi-layer construction including a first layer, shown as top layer 402, a second layer, shown as middle layer 404, and a third layer, shown as bottom layer 406. In other embodiments, the insulation 400 has a different number of layers (e.g., two, four, etc.) and/or has a single-layer construction. According to an exemplary embodiment, the top layer 402 and the bottom layer 406 are manufactured from a first material and the middle layer 404 is manufactured from a second material different than the first material. By way of example, the first material of the top layer 402 and the bottom layer 406 may be mica and the second material of the middle layer 404 may be fiberglass. The mica of the top layer 402 may provide a solid, waterproof surface upon which a temperature sensor may be mounted, as described in more detail herein. In another embodiment, the top layer 402, the middle layer 404, and the bottom layer 406 are manufactured from the same material or three different materials. According to an exemplary embodiment, the insulation 400 is positioned to limit heat transfer from the top portion 200 to the base 300 (e.g., to prevent damage to sensitive electronic components housed within the base 300, etc.).

As shown in FIGS. 2, 3, and 5-7, the temperature-regulating appliance 100 includes one or more sensors, shown as temperature sensors 500. According to an exemplary embodiment, the temperature sensors 500 are position to measure a temperature (e.g., an approximate temperature, etc.) of a component of the temperature-regulating appliance 100 (e.g., the top portion 200, etc.) and/or a temperature of a item of cookware and/or food product placed atop the top portion 200. As shown in FIG. 7, the temperature sensors 500 are (i) disposed between the top layer 402 of the insulation 400 and the lower surface 204 of the top portion 200 and (ii) positioned within the airgap 410. According to the exemplary embodiment shown in FIGS. 2, 3, and 6, the temperature-regulating appliance 100 includes two temperature sensors 500 disposed along a central axis on the insulation 400. In another embodiment, the temperature-regulating appliance 100 includes several temperature sensors 500 variously positioned at various locations along the top portion 200. According to the exemplary embodiment shown in FIG. 7, the temperature sensors 500 engage the lower surface 204 of the top portion 200. The temperature sensors 500 may be or include various different temperature measurement sensors such as, for example, a thermistor, a thermocouple, and/or any other suitable temperature measurement device.

As shown in FIGS. 5 and 7, the temperature sensors 500 include a base portion, shown as mount 502, configured to facilitate coupling each of the temperature sensors 500 to the top layer 402 of the insulation 400. The mount 502 may be secured to the insulation 400 using adhesive, a fastener (e.g., screws, bolts, staples, etc.), a hook and loop fastener, and/or still another suitable coupler. The mount 502 may be a thin circular piece of mica with a slightly larger diameter than the temperature sensors 500. As shown in FIGS. 5 and 7, the temperature sensors 500 include a connector, shown as wiring 504, that electrically couples the temperature sensors 500 to the electronics package 310 positioned within the base 300 (e.g., the wiring 504 is routed through the upper wall 306 of the housing 302, through the sidewalls 304 of the housing 302, through the insulation 400, etc.). In such an arrangement, the temperature sensors 500 may remain coupled to the base 300 and decouple from the top portion 200 when the base 300 is selectively detached from the top portion 200.

In other embodiments, one or more of the temperature sensors 500 are additionally or alternatively directly coupled to the top portion 200 and selectively electrically coupled to the electronics package 310 of the base 300. By way of example, the mounts 502 may be secured to the lower surface 204 of the top portion 200 and the wiring 504 may include quick adapters or connectors configured to selectively engage with interfaces on the base 300 to electrically couple the temperature sensors 500 to the electronics package 310. In such an arrangement, one or more of the temperature sensors 500 may remain coupled to the top portion 200 and decouple from the base 300 when the base 300 is selectively detached from the top portion 200.

A variety of different mounting configurations may be utilized to releasably secure the base 300 to the top portion 200. By way of example, the temperature-regulating appliance 100 may include an adapter having features (e.g., clips, latches, hooks, etc.) that engage with a series of interfaces of the top portion 200 and/or the base 300. By way of another example, the temperature-regulating appliance 100 may include an adapter that is releasably secured to the top portion 200 and/or the base 300 via fasteners (e.g., screws, bolts, etc.). According to the exemplary embodiment shown in FIGS. 4-7, the mounting adapter 600 is a multi-piece mounting adapter configured to releasably secure the base 300 to the top portion 200. In other embodiments, the mounting adapter 600 is a single-piece mounting adapter. In still other embodiments, the mounting adapter 600 or a portion thereof is integrally formed with the top portion 200 and/or the base 300.

As shown in FIGS. 4-7, the mounting adapter 600 includes first portions, shown as flanges 610, coupled to the lower wall 308 of the housing 302 along opposing edges thereof, and a second portion, shown as bracket 620, coupled to the lower surface 204 of the top portion 200. In other embodiments, the flanges 610 extend at least partially along each of the edges of the lower wall 308. In other embodiments, the flanges 610 are otherwise positioned on another portion of the housing 302 that provides adequate structural support (e.g., the sidewalls 304, the upper wall 306, etc.). The flanges 610 may be manufactured from a single piece of material or may be manufactured from multiple pieces of material that are welded or otherwise fastened together. According to an exemplary embodiment, each of the flanges 610 is manufactured from a thin piece of stainless steel that is stamped or otherwise formed in the shape of an elongated rectangle.

According to an exemplary embodiment, the flanges 610 are removably coupled to the housing 302. As shown in FIG. 4, each of the flanges 610 defines a plurality of apertures, shown as through-holes 612, configured to facilitate releasably securing the flanges 610 to the housing 302 and/or the bracket 620. According to the exemplary embodiment shown in FIG. 4, the flanges 610 are releasably secured to the housing 302 via a plurality of fasteners (e.g., screws, bolts, etc.), shown as fasteners 618. In other embodiments, the flanges 610 are integrally formed with the housing 302 or fixedly secured thereto (e.g., welded, with adhesive, etc.). As shown in FIG. 4, each of the flanges 610 defines one or more elongated slots, shown as slots 614, that are oriented in a direction that is substantially parallel to a longitudinal edge, shown as edge 616, of the flanges 610. The slots 614 may be configured to minimize the mass of each of the flanges 610 and/or facilitate adjusting the position of the flanges 610 relative to the top portion 200. According to the exemplary embodiment shown in FIG. 4-7, the edges 616 of the flanges 610 are oriented in a direction that is substantially parallel with the sidewalls 304 of the housing 302. More specifically, the edges 616 of each of the flanges 610 extend beyond the sidewalls 304, thereby forming a lip around at least a portion of the periphery of the base 300.

Figure 6:
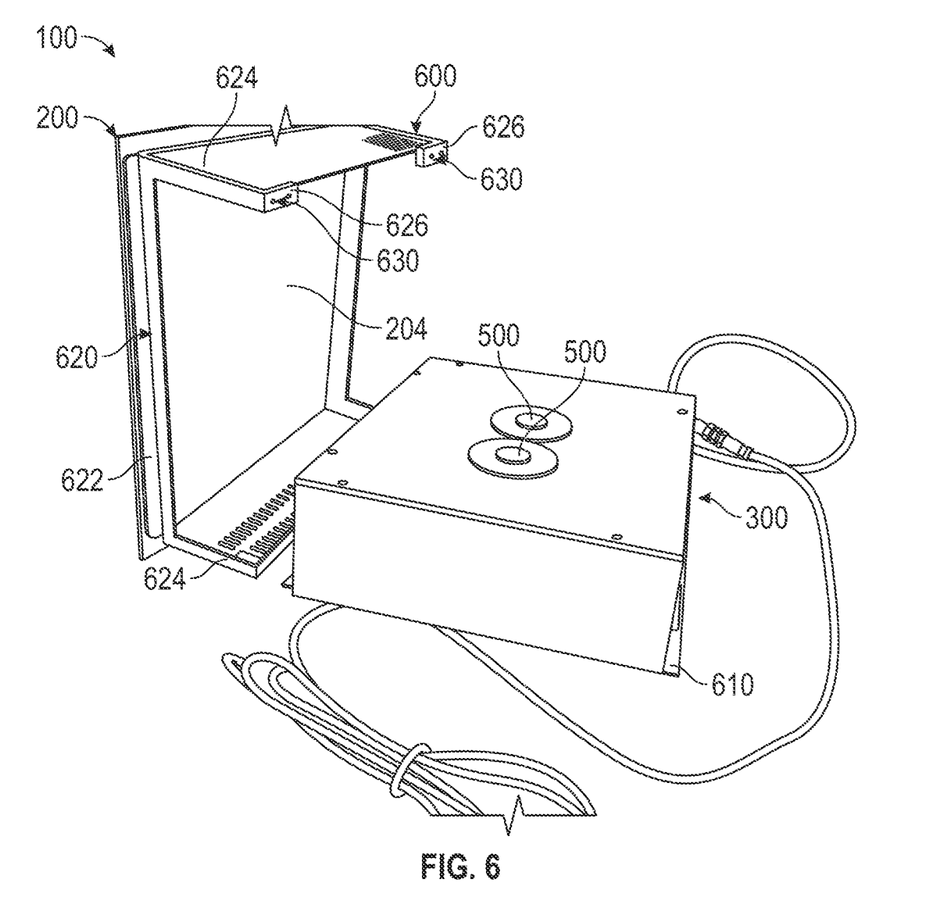
FIG. 6 is a perspective view of the appliance of FIG. 1 with the top portion separated from the base portion, according to an exemplary embodiment.

As shown in FIGS. 6 and 7, the bracket 620 includes a base, shown as frame 622, having a pair of vertical legs, shown as legs 624, positioned along and extending from opposing sides of the frame 622. In other embodiments, the legs 624 extend from each side of the frame 622. According to the exemplary embodiment shown in FIG. 7, the frame 622 is fixedly secured to the lower surface 204 of the top portion 200 via a coupler, shown as bracket coupler 640. In one embodiment, the bracket coupler 640 includes an adhesive (e.g., silicone glue, etc.). In other embodiments, the bracket coupler 640 includes fasteners (e.g., bolts, screws, etc.) configured to releasably secure the frame 622 to the lower surface 204 of the top portion 200. In still other embodiments, the frame 622 is integrally formed with the top portion 200.

According to the exemplary embodiment shown in FIG. 7, the frame 622 extends along the periphery of the top portion 200. In alternative embodiments, the top portion 200 is much larger than the base 300 such that the frame 622 may be disposed at any other suitable location along the lower surface 204 of the top portion 200 (e.g., spaced from the periphery thereof, etc.). In some embodiment, a plurality of the brackets 620 are coupled to the top portion 200 to facilitate coupling two or more of the bases 300 to a single top portion 200. As shown in FIGS. 6 and 7, the legs 624 are oriented substantially perpendicular to the top portion 200 such that the legs 624 extend substantially perpendicular to the lower surface 204 of the top portion 200. In other embodiments, the legs 624 may be angled inward or outward (e.g., to accommodate a smaller base 300, to accommodate a larger base 300, etc.).

As shown in FIGS. 6 and 7, the bracket 620 includes a plurality of interfaces, shown as flanges 626, that extend from the bottom edges of the legs 624. As shown in FIG. 7, the flanges 626 are configured to interface with the flanges 610 to facilitate releasably securing the base 300 to the bracket 620 and, thereby, the top portion 200. As shown in FIG. 6, the flanges 626 of the legs 624 define a plurality of apertures, shown as mounting holes 630. According to an exemplary embodiment, the mounting holes 630 are positioned to align with the through-holes 612 of the flanges 610. According to an exemplary embodiment, the fasteners 618 are configured to interface with the through-holes 612 and the mounting holes 630 to secure the legs 624 to the flanges 610, thereby releasably securing the base 300 to the top portion 200. In other embodiments, the flanges 610 are integral with the legs 624 (e.g., a one-piece adapter, etc.) and facilitate releasably coupling the legs 624 directly to the housing 302 of the base 300.

As shown in FIGS. 1 and 7, the top portion 200 includes an extended peripheral edge, shown as cantilevered edge 206, that extends beyond the sidewalls 304 of the base 300 and the mounting adapter 600 (e.g., such that the periphery of the top portion 200 is cantilevered beyond the sidewalls 304 and the mounting adapter 600, etc.). According to an exemplary embodiment, the temperature-regulating appliance 100 is configured to be mounted to a countertop. Specifically, the temperature-regulating appliance 100 may be inserted into a cutout formed in the countertop. The cutout may be sized such that the cantilevered edge 206 of the top portion 200 contacts an upper surface of the countertop and the base 300 extends beneath the countertop. According to an exemplary embodiment, the top portion 200 is configured to be affixed (e.g., mounted, etc.) to the countertop, for example, by applying an adhesive between the upper surface of the countertop and the lower surface 204 of the cantilevered edge 206 of the top portion 200. In some embodiments, the adhesive is or includes silicon glue that is applied in (i) between the cantilevered edge 206 and the top surface of the countertop and/or (ii) along a joint formed between the cantilevered edge 206 and the countertop. In addition to securing the top portion 200 to the countertop, the adhesive may form a watertight seal that prevents water or other liquids from passing through the cutout in the countertop and from being retained in any small spaces between the top portion 200 and the countertop. Additionally, the adhesive may be used to secure a stainless steel ring around the perimeter of the top portion 200 for a more aesthetically pleasing look. Among other benefits, the stainless steel ring may shield the joint from exposure to spills from liquids and other food products that might be encountered during regular use. In other embodiments, the top portion 200 of the temperature-regulating appliance 100 is otherwise coupled to a countertop or other surface. By way of example, the top portion 200 may be coupled to the countertop using a flush mount kit such that the top portion 200 is flush or substantially flush with the surface of the countertop.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the temperature-regulating appliance 100 and the components thereof (e.g., the top portion 200, the base 300, the insulation 400, the temperature sensors 500, the mounting adapter 600, etc.) as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:
1. A temperature-regulating appliance comprising:
   a base including:

a housing defining an internal compartment; and a thermal element disposed within the internal compartment of the housing; and a mounting adapter extending along opposing edges of the housing and coupled directly to a bottom of the housing, the mounting adapter configured to facilitate detachably coupling the base to a cooktop;

wherein the mounting adapter remains attached to the housing when the base is decoupled from the cooktop wherein a temperature sensor is coupled to the base such that the temperature sensor is positioned vertically above and in alignment with the thermal element and remains with the base when the base is detached from the cooktop.

2. The temperature-regulating appliance of claim 1, further comprising insulation positioned along an upper portion of the housing.

3. The temperature-regulating appliance of claim 2, wherein the insulation is positioned between the housing and the temperature sensor.

4. The temperature-regulating appliance of claim 1, wherein the mounting adapter includes a first flange and a second flange positioned along the bottom and extending laterally outward from the opposing edges of the housing.

5. The temperature-regulating appliance of claim 4, wherein the first flange and the second flange are configured to releasably engage with a first bracket and a second bracket extending downward from a lower surface of the cooktop.

6. The temperature-regulating appliance of claim 5, wherein the first flange is releasably coupled to the housing of the base.

7. The temperature-regulating appliance of claim 5, wherein the first flange is fixed to the housing of the base.

8. A temperature-regulating appliance comprising:
a housing defining an interior chamber;
a thermal element positioned within the interior chamber; and
a temperature sensor positioned outside of the interior chamber and spaced from the thermal element, wherein the temperature sensor is positioned vertically above and in alignment with the thermal element, and wherein the temperature sensor is configured to remain with the housing when the housing is detached from a cooktop.

9. The temperature-regulating appliance of claim 8, wherein the temperature sensor is positioned to engage the cooktop when the housing is coupled to the cooktop.

10. The temperature-regulating appliance of claim 8, further comprising an insulating layer disposed along an upper surface of the housing and positioned between the housing and the temperature sensor.

11. The temperature-regulating appliance of claim 10, wherein the insulating layer has a multi-layer structure including at least a first layer and a second layer, and wherein the first layer and the second layer are manufactured from different materials.

12. The temperature-regulating appliance of claim 8, further comprising an adapter extending at least partially along a periphery of the housing, the adapter configured to facilitate detachably coupling the housing to the cooktop.

13. The temperature-regulating appliance of claim 12, wherein the adapter is releasably coupled to the housing.

14. The temperature-regulating appliance of claim 12, wherein the adapter is fixed to or integrally formed with the housing.

15. An induction range comprising:
a base including:
a housing defining an internal compartment;
an inductive heating element positioned within the internal compartment of the housing; and
insulation disposed along a top of the housing to thermally isolate the housing from a cooktop upon which a pot or pan rests;
a mounting adapter positioned to facilitate detachably coupling the base to the cooktop such that the insulation is positioned beneath the cooktop; and
a temperature sensor positioned outside of the internal compartment wherein the temperature sensor is coupled to the base such that the temperature sensor is positioned vertically above and in alignment with the inductive element and remains with the base when the base is detached from the cooktop.

16. The induction range of claim 15, wherein the mounting adapter extends along opposing edges of the housing and is coupled directly to a bottom of the housing, and wherein the mounting adapter is attached to the base when decoupled from the cooktop.

17. The induction range of claim 16, wherein the mounting adapter includes a first flange and a second flange positioned along the bottom and extending laterally outward from the opposing edges of the housing.

18. The induction range of claim 15, wherein the insulation has a multi-layer structure including at least a first layer and a second layer, and wherein the first layer and the second layer are manufactured from different materials.

* * * * *